US011154081B1

(12) United States Patent
Lele et al.

(10) Patent No.: US 11,154,081 B1
(45) Date of Patent: *Oct. 26, 2021

(54) WELL COOKED EGG POWDER

(71) Applicant: LIL MIXINS, LLC, Philadelphia, PA (US)

(72) Inventors: Meenal Lele, Philadelphia, PA (US); James Petitti, Milford, IA (US)

(73) Assignee: LIL MIXINS, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,901

(22) Filed: Mar. 16, 2021

(51) Int. Cl.
| | | |
|---|---|---|
| A23L 15/00 | (2016.01) | |
| A23L 33/00 | (2016.01) | |
| A23L 5/10 | (2016.01) | |
| A23B 5/035 | (2006.01) | |
| A23P 10/40 | (2016.01) | |
| A23B 5/005 | (2006.01) | |
| A23L 5/00 | (2016.01) | |
| A23L 3/46 | (2006.01) | |

(52) U.S. Cl.
CPC ............ *A23L 15/00* (2016.08); *A23B 5/0055* (2013.01); *A23B 5/035* (2013.01); *A23L 3/46* (2013.01); *A23L 5/13* (2016.08); *A23L 5/15* (2016.08); *A23L 5/51* (2016.08); *A23L 33/40* (2016.08); *A23P 10/40* (2016.08); *A23V 2002/00* (2013.01); *A23V 2200/304* (2013.01); *A23V 2300/10* (2013.01); *A23V 2300/24* (2013.01)

(58) Field of Classification Search
CPC ... A23L 15/00; A23L 5/13; A23L 5/15; A23L 33/40; A23L 3/02–3/245; A23L 3/46; A23L 3/40–3/54; A23L 5/10; A23L 5/51; A23L 5/55; A23B 5/005–5/01; A23B 5/02–5/035; A23P 10/40; A23V 2002/00; A23V 2300/10; A23V 2300/24; A23V 2200/304; A23C 1/16; A23C 9/154
See application file for complete search history.

(56) References Cited

U.S. PATENT DOCUMENTS

| | | | | |
|---|---|---|---|---|
| 233,750 | A * | 10/1880 | Halvorson | |
| 1,630,756 | A * | 5/1927 | Parsons | A23L 15/00 426/614 |
| 1,891,887 | A * | 12/1932 | Clickner | A23B 5/035 426/456 |
| 2,139,696 | A * | 12/1938 | Reynolds | B01D 29/01 426/495 |
| 2,699,996 | A * | 1/1955 | Sargent | A23B 5/025 426/456 |
| 2,999,024 | A * | 9/1961 | Stimpson | A23L 15/00 426/614 |
| 3,028,245 | A * | 4/1962 | Mink | A23B 5/025 426/330.1 |
| 3,060,038 | A * | 10/1962 | Mancuso | A23B 5/02 426/10 |
| 3,077,411 | A * | 2/1963 | Mitchell | A23B 5/02 426/299 |
| 3,082,098 | A * | 3/1963 | Bergquist | A23B 5/035 159/48.1 |
| 3,093,487 | A * | 6/1963 | Jones | A23B 5/041 426/614 |
| 3,114,645 | A * | 12/1963 | Blanken | A23L 15/20 426/614 |
| 3,170,804 | A * | 2/1965 | Kline | A23B 5/025 426/268 |
| 3,393,074 | A | 7/1968 | Erlich | |
| 3,720,253 | A * | 3/1973 | Ballas | B04C 5/28 159/4.08 |
| 3,778,425 | A * | 12/1973 | Kandatsu | A23J 1/08 530/424 |
| 4,279,932 | A | 7/1981 | Koshida | |
| 5,164,217 | A | 11/1992 | Wong et al. | |
| 5,487,911 | A * | 1/1996 | Ueda | A23L 15/00 426/471 |
| 5,736,181 | A * | 4/1998 | Bezner | A23L 15/20 426/285 |
| 6,149,964 | A | 11/2000 | Theuer et al. | |
| 6,358,554 | B1 * | 3/2002 | Hagiwara | A23L 15/25 426/614 |
| 6,579,551 | B1 * | 6/2003 | Theuer | A23L 15/20 426/321 |
| 9,731,003 | B2 | 8/2017 | Nadeau | |
| 9,913,488 | B2 | 3/2018 | Book | |

(Continued)

FOREIGN PATENT DOCUMENTS

| | | |
|---|---|---|
| CN | 103303 | 5/1989 |
| CN | 1086966 | 5/1994 |

(Continued)

OTHER PUBLICATIONS

Love and Lemons NPL, https://www.loveandlemons.com/wprm_print/46490, Jun. 2020 (Year: 2020).*

(Continued)

*Primary Examiner* — Drew E Becker

(74) *Attorney, Agent, or Firm* — Gottlieb, Rackman & Reisman, P.C.

(57) ABSTRACT

A nutritional or dietary egg supplement or food product is provided that may be eaten by children or adults. The food product is made solely of whole hen's eggs or egg whites that have been heat treated to selectively denature allergenic proteins s compared to a natural hen's egg.

17 Claims, No Drawings

(56) References Cited

U.S. PATENT DOCUMENTS

| | | | | |
|---|---|---|---|---|
| 2004/0213885 | A1* | 10/2004 | Bisson | A23C 19/093 426/614 |
| 2009/0220674 | A1 | 9/2009 | Katz et al. | |
| 2009/0317516 | A1* | 12/2009 | Newsteder | A21D 10/045 426/72 |
| 2010/0255039 | A1 | 10/2010 | Fritsche | |
| 2014/0234501 | A1* | 8/2014 | Sant | A23B 5/02 426/311 |
| 2015/0079233 | A1* | 3/2015 | Calleja Araque | A23K 10/20 426/47 |
| 2016/0338400 | A1 | 11/2016 | Avital et al. | |
| 2017/0056494 | A1 | 3/2017 | Nadeau | |
| 2018/0020712 | A1 | 1/2018 | Brown | |
| 2019/0167577 | A1* | 6/2019 | Leitner | A61K 39/35 |
| 2019/0343162 | A1* | 11/2019 | Yepes | A23L 7/126 |
| 2020/0170262 | A1* | 6/2020 | Reed | A21D 13/45 |
| 2020/0390133 | A1* | 12/2020 | Lele | A23L 15/20 |

FOREIGN PATENT DOCUMENTS

| | | |
|---|---|---|
| CN | 1142915 | 2/1997 |
| CN | 101690596 | 4/2010 |
| CN | 102613482 | 8/2012 |
| CN | 106165870 | 11/2016 |
| CN | 107969617 | 5/2018 |
| EP | 0038684 B1 | 7/1984 |
| GB | 756643 A | 9/1956 |
| WO | 2018057926 | 3/2018 |

OTHER PUBLICATIONS

Fit Foodie Finds NPL, https://fitfoodiefinds.com/how-to-bake-eggs-in-oven/, Feb. 25, 2021 (Year: 2021).*

Effects on Physical and Functional Properties of Dried Whole Eggs of Cassava (Manihot Esculenta Crantz) Starch Additive and Corn Syrup Additive; Masilungan-Manuel, Joanna Tess, Sino CL, Jarin AV, Vera FC; In 4th International Conference on Biotechnology and Environment Management 2014 (vol. 75, p. 47); Lacsit Press, Singapore; http://www.ipcbee.com/vo175/008-ICBEM2014-S1001.pdf.

How to Make Powdered Eggs; http://tacticalintelligence.net/blog/how-to-make-powdered-eggs.htm Erich/Prepper Academy.

Eggs—Beating Techniques for Egg Whites; Sarah Phillips; Crafty Baking.com;https://www.craftybaking.com/howto/eggs-beating-techniques-egg-whites.

Feeding babies egg and peanut may prevent food allergy; Imperial College, London, Science Daily; Sep. 20, 2016; https://www.sciencedaily.com/releases/2016/09/160920112328.htm.

Baked Milk- and Egg-Containing Diet in the Management of Milk and Egg Allergy; Leonard SA, Caubet JC, Kim JS, Groetch M, Nowak-Węgrzyn A; The Journal of Allergy and Clinical Immunology: In Practice. Jan. 1, 2015;3(1):13-23; https://www.sciencedirect.com/science/article/abs/pii/S2213219814004188.

American Egg Board; Incredible Egg Cooking School—Soft Meringue; (The Incredible Egg) How to Make a Soft Meringue . . . Retrieved from: https:/www.incredibleegg.org/cooking-school/eggs-baking/make-soft-meringue/. Jun. 16, 017.

Du Toit, et al.; Prevention of food allergy. J Allergy Clin Immunol.; London, United Kingsom; 137 (4). Apr. 2016.

International Search Report and Written Opinion, U.S. Patent and Trademark Office, corresponding Application No. PCT/US2020/023517, dated Jun. 18, 2020.

VVatson, E; "Lil Mixins makes early introduction of potential allergens easy for parents", [Retrieved from the internet on Feb. 25, 2020]; https://www. food navigator-usa .com/ Article/20 18/08/27/lii-Mixins-makes-early-introduction-of-potential-allergens-easy-for-parents; p. 1. top and bottom; p. 2. picture and bottom: p. 3, top-middle; p. 1, top-middle; Aug. 27, 2018.

International Search Report and Written Opinion, U.S. Patent and Trademark Office, Application No. PCT/US2020/0014246, dated Apr. 20, 2020.

George N. Konstantinou, MD, MSC et al; Consumption of heat-treated egg by children allergic or sensitized to agg can affect the natural course of egg allergy . . . ; From the Allergy Department, Pediatric Hospital "P & A Kiriakou," National and Kapodistrian University of Athens, Athens, Greece. Letters to the Editor; Allergy Clin Mmunol., Aug. 2008; pp. 414-415.

Stephanie A. Leonard MD et al; Dietary Baked Egg Accelerates Resolution of Egg Allergy in Children; J. Allergy Clini. Immunol., Aug. 2012; 130 [2] pp. 473-480.

Stephanie A. Leonard MD et al; Dietary Baked Egg Accelerates Resolution of Egg Allergy in Children; American Academy of Allergy, Asthma & Immunology; 2012 http://dx.doi.org/10.1016/j.jaci.2012.06.006.

Zoubida Akkouche et al.; Effect of Heat on Egg White Proteins;International Conference on Applied Life Sciences (ICALS2012)/ISALS Turkey, Sep. 10-12, 2012.

Julie Wang, MD; Egg allergy: Clinical Features and Diagnosis—Wolters Kluwer; UpToDate; www.uptodate.com, Oct. 16, 2020.

Julie Wang, MD; Egg allergy: Management—UpToDate; Wolters Kluwer; UpToDate; www.uptodate.com, May 10, 2019.

Heather Lemon-Mule, MD; Immunologic changes in children with egg allergy ingesting extensively heated egg; [Food, drug, insect sting allergy, and anaphylaxis—Rapid Publication] American Academy of Allergy, Asthma & Immunology; doi:10.1016/j.jaci.2008.09.007; 2008.

Makiko Suzuki et al.; Lipocalin-Type Prostaglandin DSynthase and Egg White CystatinReact with IgE Antibodies fromChildren with Egg Allergy; Allergology International. 2010;59, No. 2: pp. 175-183.

Gustavo Martos, BS et al; Mechanisms underlying differential food allergy response to heated egg; J Allergy Clin Immunol; vol. 127, No. 4; Apr. 2011; pp. 991-997.

Maresa Botha, MD.; Rural and urban food allergy prevalence from the South African Food Allergy; J Allergy Clin Immunol; vol. 143, No. 2; 2018 American Academy of Allergy, Asthma & Immunology https://doi.org/10.1016/j.jaci.2018.07.023; pp. 662-668.

Roberto J. Rona, FFPH; The prevalence of food allergy—a meta-analysis. J Allergy Clin Immunol 2007; 2007 American Academy of Allergy, Asthma & Immunology; doi:10.1016/j.jaci.2007.05.026; Jul. 12, 2007; pp. 638-646.

Rachel L. Peters, PhD; The prevalence of food allergy and other allergic diseases in early childhood in a population-based study; J Allergy Clin Immunol; vol. 140, No. 1; Available online May 14, 2017. http://dx.doi.org/10.1016/j.jaci.2017.02.019; pp. 145-153.

Johlman et al;Tolerance to cooked egg in an egg allergic popuation; Allergy Net; Accepted for publication Feb. 19, 2006; Allergy 2006: 61:899-901.

John Michaelides; Baker's Journal, A Primer on Preservatives Aug. 2015. https://www.bakersjournal.com/a-primer-on-preservatives-6271/.

* cited by examiner

WELL COOKED EGG POWDER

BACKGROUND OF THE INVENTION

As is known, food allergy rates have been on the rise over the last several years.

In particular, egg allergy is the second most common food allergy in infants and young children. Egg allergies are IgE antibody mediated immunologic responses to proteins in a hen's egg.

Studies and a subsequent meta-analysis have shown that starting regular exposure of eggs between the ages of 4 and 6 months old, and continuing that exposure through the 1st birthday can provide protection against egg allergy. The problem; however, is that babies cannot eat cooked eggs in their natural form at that young an age. They choke easily and typically require food in mush or slurry form.

A meta-analysis of the prevalence of food allergy estimates that egg allergy affects 0.5 to 2.5 percent of young children.

The form of the egg has been shown to be a contributing factor to egg allergy prevalence. An Australian population-based cohort study challenged children using raw egg white and reported an egg allergy prevalence of 9.5 percent (95% CI 8.7-10.3 percent) at one year and 1.2 percent (95% CI 0.9-1.6 percent) at four years. Challenge-proven egg allergy in South African toddlers (12 to 36 months) was 1.9 percent (95% CI 1.1-2.7) for raw egg white and 0.8 percent (95% CI 0.3-2.3) for cooked egg.

Five domestic chicken egg proteins (*Gallus domesticus*) have been identified as responsible for IgE-mediated reactions; these are designated Gal d 1 to 5. Most of the allergenic egg proteins are found in egg white, including ovomucoid (Gal d 1), ovalbumin (Gal d 2), ovotransferrin (Gal d 3), lysozyme (Gal d 4), and ovomucin.

Ovomucoid is the dominant allergen in egg (i.e., is the allergen to which the most patients are sensitized), although ovalbumin is the most abundant protein comprising hen's egg white.

Currently available in the marketplace is the product SpoonfulOne, which is a powder blend of small amounts of different food protein. These food proteins include peanuts, milk, raw eggs, almonds, soy, wheat, shrimp, cashews, hazelnuts, oat, cod, pecans, salmon, sesame, walnuts, and pistachios. Each daily serving has less than 1 gram total of 16 different proteins. SpoonfulOne is less than desirable since it does not provide a sufficient amount of protein as proven to reduce food allergy rates. The egg protein in SpoonfulOne is not a well-cooked egg.

Ready, Set, Food sells a powder in single serve packs which contains peanut, milk, and raw eggs. The egg protein in ReadySetFood is not a well-cooked egg.

Grocery alternatives include eggs, which must be cooked and prepared for a baby. Scrambled eggs are problematic since they clump, thereby providing a choking risk for a baby. Scrambled eggs are not considered well-cooked, but rather heated or lightly cooked. Correct preparation is to boil the eggs, and then puree the egg into food. Also, raw egg powder may be used, which is either freeze-dried, spray dried, or drum dried raw egg. When mixed with water, egg powders turn into raw, uncooked egg which must then be prepared like a grocery egg.

Studies have found that the majority of egg-allergic individuals can tolerate extensively heated (well-cooked) or baked egg. Heating denatures proteins, reducing allergenicity of ovalbumin and ovomucoid and thereby altering digestion and absorption of these proteins in the gastrointestinal tract.

Ovalbumin epitopes are heat labile, but ovomucoid epitopes are not altered by extensive heating, suggesting that children who have specific IgE primarily to ovalbumin are likely to tolerate heated forms of egg.

Properly "well-cooked" eggs should reduce the allergenicity of the ovalbumin and ovomucoid by at least 20% up to 100%.

Well-cooked eggs have been studied in multiple studies and shown to reduce the risk of egg allergy when fed to infants regularly.

Per the 2020 AAAAI guidelines, and the 2020 USDA Dietary Feeding guidelines, all infants should be fed well-cooked egg in an infant safe form.

The need therefore exists for an infant safe well-cooked egg that meets these requirements.

Accordingly, it would be desirable to provide a well-cooked egg food product that is specially created for babies in order to reduce the risk of developing a food allergy. The product should contain a suitable quantity of food protein, and should not be overly processed. Additionally, the well-cooked egg food product should have a minimal risk of choking and should have a markedly reduced chance of bacterial or fungal growth.

SUMMARY OF THE INVENTION

Generally speaking, in accordance with the invention, a nutritional or dietary supplement or food product is provided that may be eaten by children or adults. The food product is made solely of whole hen's eggs or egg whites that have been extensively heat treated to selectively denature the allergenic proteins relative to a natural hen's egg as measured by analytic techniques such as SDS-PAGE or ELISA.

Accordingly, it is an object of the invention to provide an improved egg food product for infants or babies.

Another object of the invention is to provide an egg food product that has a sufficient amount of food protein.

A further object of the invention is to provide an egg food product that is easy for an infant or baby to eat and digest.

Yet another object of the invention to create an improved egg food product with a texture that is developmentally appropriate for an infant as young as 4 months old.

Still a further object of the invention is to provide a hen's egg food product that has reduced Gal d 2 (ovalbumin) without the use of other ingredients, enzymes, or preservatives.

Another object of the invention is for an egg food product that is shelf-stable at room temperature for at least 6 months.

A further object of the invention is an egg food product that is water soluble.

Still other objects and advantages will be obvious from the following description.

DETAILED DESCRIPTION

The inventive process begins with selecting either whole eggs in shells or liquid egg whites or liquid whole eggs. The liquid eggs (whites or whole) if selected, may be raw or frozen. Frozen liquid eggs, if selected for the inventive process, are typically first defrosted.

The next step in the inventive process is boiling the whole eggs or egg liquid whites at 100 C for at least 10 mins, and up to 30 mins. The purpose is to denature the proteins in the eggs. The exact time will depend on the desired level of protein to be denatured—the longer the eggs are boiled, the more the protein in the eggs will be denatured. The whole egg in its shell or liquid egg white or liquid whole egg may, alternatively, be baked using dry heat at approximately 170 C-185 C for 10 mins-30 mins. The eggs must be cooled after either boiling or baking; in the case of whole eggs, the shells are removed.

The next step in the process is that the well-cooked eggs and water are aggressively mixed utilizing a suitable high shear mixer or blender or agitator until the mixture is homogenous with 5-25% solids by weight. The shelled cooked eggs may first be chopped or diced prior to being added to the high shear mixer.

Mixing should be carried out without the addition of heat or some other pasteurization step that would otherwise affect the proteins in the eggs. The resulting mixed egg solution should be homogenous, meaning that it can pass through at least a 16 mesh screen (US Standard mesh), and have a viscosity in the range of 100-1000 cp.

The next step in the process is drying the mixture in order to produce a dried egg powder product. The mixture must be continuously agitated prior to drying to maintain homogeneity. The drying process must be kept aseptic at all times by using sanitizing equipment, and good manufacturing procedures.

Drying may be performed using a spray dryer that is operated at a preferred pressure, with an inlet temp of about 160-220 C, and outlet temperature of about 60-90 C. Spray drying pushes the liquid through a nozzle, which has holes that determine the size of the particles that exit therefrom. The resulting dried egg powder should have a particle size of between about 60 and 200 mesh (US standard).

Alternatively, drying may be carried out using a drum drier, dehydrator, or freeze-dryer; however drying by means of a drum dryer, dehydrator or freeze-dryer will require the use of a milling or grinding step after drying to achieve a dried egg powder having a particle size of between about 60 and 200 mesh.

The dried egg powder should be at least 90% water soluble as measured through a 20 mesh screen (no more than 10% of the particles are caught in the screen).

In use, the well-cooked egg powder product of the invention is proportioned and fed to infants older than 4 months old by mixing the powder into breastmilk, formula, or developmentally-appropriate pureed foods. Suitable pureed foods include vegetables, fruits, yogurt, or wheat cereal.

The well-cooked egg powder product of the invention is preferably fed to infants 1-3 times per week in serving sizes of 0.5-2 g of powder so as to provide an adequate exposure to eggs that is necessary to reduce the risk of developing allergic sensitization to eggs.

The well-cooked egg powder product produced in accordance with the invention is advantageous in that the correct amount of proteins per serving is provided in feeding to an infant. This is because the powder is uniform in nature and the protein content per gram is determined by protein analysis. By way of example, if a parent were to prepare eggs and feed them to a baby, the protein in the eggs is not uniformly present. Producing an egg powder in accordance with the invention provides for uniformity across servings.

The powdered egg product produced in accordance with the invention is advantageous since it has good water absorption and water adhesion characteristics. This is because it is dried and can absorb water. As a result, the powder is easily mixed into pureed food.

The powdered egg product produced in accordance with the invention is advantageous since the individual granules thereof do not adhere to each other. This is because the heating and drying process creates a stable granule. As a result, the powder cannot form a gel or solid when mixed with water. This property prevents the risk of choking an infant.

The powdered egg product produced in accordance with the invention is advantageous as it is specifically designed as an infant food product. This is because it is easily mixed into any age appropriate food and will not increase the risk of choking. As a result, it is appropriate to be fed to an infant who can tolerate solid food.

The scope of the invention will now be set forth in the following claims.

The invention claimed is:

1. A method of producing an infant or baby food product comprising:
    heating whole eggs or egg whites in order to produce well-cooked eggs, wherein the step of heating includes boiling the whole eggs or egg whites at 100 C for at least 10 minutes or baking the whole eggs or egg whites at a temperature ranging from about 170 C to about 185 C for at least 10 minutes;
    allowing the well-cooked eggs to cool;
    mixing the well-cooked eggs and water in order to produce a mixed egg solution; and
    drying the mixed egg solution in order to produce a dried well-cooked egg powder product.

2. The method of claim 1, wherein said mixing step produces a mixed egg solution that is between about 5 and 25 percent solid by weight.

3. The method of claim 1, wherein the heating step is boiling the whole eggs or egg whites to a maximum of 30 minutes.

4. The method of claim 1, wherein the heating step is baking the whole eggs or egg whites to a maximum of 30 minutes.

5. The method of claim 1, further including the step of chopping or dicing the well-cooked eggs prior to said mixing step.

6. The method of claim 1, wherein said mixing step is carried out without the addition of heat or a pasteurization process that affects proteins in the well-cooked eggs.

7. The method of claim 2, wherein said mixing step produces a homogeneous mixture that can pass through at least a 16 mesh screen and has a resulting viscosity between about 100 and 1000 cp.

8. The method of claim 1, wherein said drying step is carried out by using a spray dryer with an inlet temperature of between about 160 and 220 C and an outlet temperature of between about 60 and 90 C.

9. The method of claim 1, wherein the dried well-cooked egg powder product that is produced following said drying step has a particle size that is between about 60 and 200 mesh.

10. The method of claim 6, wherein the dried well-cooked egg powder product that is produced following said drying step has a particle size of between about 60 and 200 mesh.

11. The method of claim 1, further including a milling or grinding step following said drying step in order to produce a particle size of said dried well-cooked egg powder product of between about 60 and 200 mesh.

12. The method of claim 1, wherein at least 90% of the dried well-cooked egg powder product that is produced following said drying step is capable of passing through a 20 mesh screen, and the dried well-cooked egg powder product that is produced following said drying step is at least 90% water soluble.

13. The method of claim 10, wherein said mixing step produces a mixed egg solution that is between about 5 and 25 percent solid by weight.

14. A method for reducing the risk of developing a food allergy to eggs, the method comprising preparing a dried egg powder products in accordance with the steps of claim 1 and feeding said food products to a baby or infant of an age of at least four months old.

15. The method of claim 14, further including mixing the dried egg powder product into a food selected from the group consisting of breastmilk, formula and a pureed food prior to said feeding step.

16. The method of claim 14, wherein said feeding step is carried out in pre-measured servings of 0.5-2 grams of the dried egg powder product and at a frequency of 1-3 times per week.

17. The method of claim 14, wherein said preparing step includes:
- heating whole eggs or egg whites by either boiling or baking in order to produce said well-cooked eggs,
- mixing the well cooked eggs with water in order to produce a mixed egg solution that is between about 5 and 25 percent solid by weight, and
- drying the mixed egg solution in order to produce a dried egg powder product which has a particle size of between about 60 and 200 mesh and a water solubility of at least 90% through a 20 mesh screen.

* * * * *